US011022565B2

(12) United States Patent
Shemesh et al.

(10) Patent No.: US 11,022,565 B2
(45) Date of Patent: Jun. 1, 2021

(54) PROCESS MONITORING

(71) Applicant: APPLIED MATERIALS ISRAEL LTD., Rehovot (IL)

(72) Inventors: Dror Shemesh, Hod Hasharon (IL); Eugene T. Bullock, Rehovot (IL); Adi Boehm, Rehovot (IL); Gurjeet Singh, Rehovot (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 45 days.

(21) Appl. No.: 16/405,920

(22) Filed: May 7, 2019

(65) Prior Publication Data
US 2020/0355620 A1    Nov. 12, 2020

(51) Int. Cl.
*G01N 21/00* (2006.01)
*G01N 21/95* (2006.01)
*G01N 21/88* (2006.01)

(52) U.S. Cl.
CPC ..... *G01N 21/9501* (2013.01); *G01N 21/8851* (2013.01); *G01N 2021/889* (2013.01); *G01N 2021/8854* (2013.01)

(58) Field of Classification Search
CPC .......... G01N 21/9501; G01N 21/8851; G01N 2021/889; G01N 2021/8854
USPC ................................ 250/306, 307, 310, 311
See application file for complete search history.

(56) References Cited

U.S. PATENT DOCUMENTS 9,899,185 B1 * 2/2018 Shemesh ................. H01J 37/28
2016/0025648 A1 * 1/2016 Duffy ..................... H01J 37/222
356/237.5

* cited by examiner

*Primary Examiner* — Michael Maskell
(74) *Attorney, Agent, or Firm* — Kilpatrick Townsend & Stockton LLP

(57) ABSTRACT

A method for determining a defect material element, the method includes (a) acquiring, by a charged particle beam system and by applying a spectroscopy process, an electromagnetic emission spectrum of a part of a defect; (b) acquiring, by the charged particle beam system, a backscattered electron (BSE) image of an area that includes the defect; and (c) determining a defect material element. The determining of the defect material element includes: determining whether an ambiguity exists in the electromagnetic emission spectrum, and resolving the ambiguity based on the BSE image, when it is determined that the ambiguity exists.

13 Claims, 5 Drawing Sheets

PROCESS MONITORING

BACKGROUND OF THE INVENTION

Particles of foreign materials of nanometric scale may be formed on wafer substrates that are also referred to as bare wafers. These particles are unwanted byproducts of the manufacturing process and are regarded as defects.

The composition of these defects may affect the criticality of these defects.

There is a growing need to provide an efficient, fast, and reliable way to determine the material elements of the particles of foreign materials.

BRIEF SUMMARY OF THE INVENTION

There may be provided a method for determining a defect material element, the method may include acquiring, by a charged particle beam system and by applying a spectroscopy process, an electromagnetic emission spectrum of a part of a defect; acquiring, by the charged particle beam system, a backscattered electron (BSE) image of an area that may include the defect; and determining a defect material element; wherein the determining of the defect material element may include: (a) determining whether an ambiguity exists in the electromagnetic emission spectrum, and (b) resolving the ambiguity based on the BSE image, when it may be determined that the ambiguity exists.

The resolving of the ambiguity may include selecting the defect material element out of potential material elements that exhibit peaks that may be spaced apart from each other by an energy difference that may be lower than a resolution of the spectroscopy process.

The potential material elements may include an organic material element and a heavier material element.

The resolving of the ambiguity may include selecting the defect material element based on an intensity of one or more BSE image pixels of the defect.

The area may include the defect and a background material that surrounds the defect; wherein the method may include determining a background material element of the background material.

The determining of the defect material element may be based, at least in part, on the background material element.

The background material element has an atomic weight that may belong to a background atomic weight class, and wherein the determining of the defect material element may include determining an atomic weight class of the defect material element based on a relationship between (a) an intensity parameter of one or more BSE image pixels of the background material, and (b) the intensity parameter of one or more BSE image pixels of the defect.

The method may include classifying the atomic weight class of the defect material element to a class out of (a) lighter than background material class, (b) the background atomic weight class, and (d) at least one class of heavier than background material class.

The background material may be silicon, wherein the determining of the defect material element may include classifying the defect material element to a class out of (a) second period of the periodic table of elements, (b) third period of the periodic table of elements, (c) fourth period of the periodic table of elements, and (d) sixth period of the periodic table of elements.

The method may include determining whether the ambiguity exists in the electromagnetic emission spectrum, and acquiring the BSE image only when the ambiguity exists in the electromagnetic emission spectrum.

The acquiring of the BSE image may include illuminating the area with electrons having an incident energy; and generating the BSE image substantially only from BSE electrons having an energy that may be above an energy threshold.

The acquiring of the BSE image may include rejecting BSE electrons that originate from locations that may be positioned below a certain depth from a surface of the area.

There may be provided a computer readable medium that may be not transitory and stores instructions that once executed by a computerized system causes the computerized system to execute a process that may include: acquiring, by a charged particle beam system and by applying a spectroscopy process, an electromagnetic emission spectrum of a part of a defect; acquiring, by the charged particle beam system, a backscattered electron (BSE) image of an area that may include the defect; and determining a defect material element; wherein the determining of the defect material element may include: (a) determining whether an ambiguity exists in the electromagnetic emission spectrum, and (b) resolving the ambiguity based on the BSE image, when it may be determined that the ambiguity exists.

There may be provided a charged particle beam system that may include charged particle optics and a processor, wherein the charge particle optics may be configured to (i) acquire, by applying a spectroscopy process, an electromagnetic emission spectrum of a part of a defect; (ii) acquire a backscattered electron (BSE) image of an area that may include the defect; and wherein the processing circuitry may be configured to determine a defect material element by (a) determining whether an ambiguity exists in the electromagnetic emission spectrum, and (b) resolving the ambiguity based on the BSE image, when it may be determined that the ambiguity exists.

BRIEF DESCRIPTION OF THE DRAWINGS

The subject matter regarded as the disclosure is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

Figure 1:
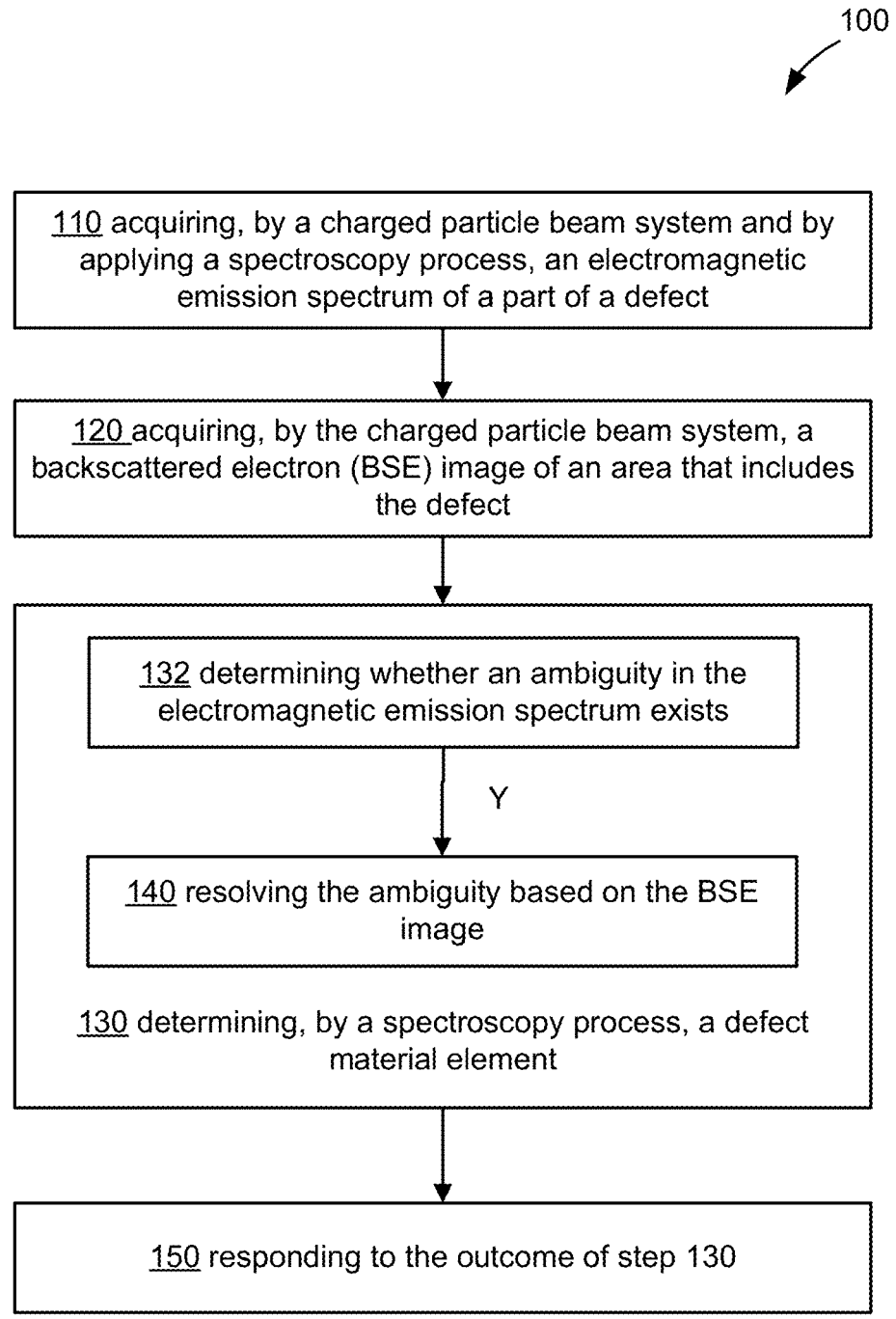
FIG. 1 illustrates an example of a method for determining a defect material element.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

Ambiguity Resolution:

There may be provided a system, a method and a computer readable medium for process monitoring.

A particle of foreign material (hereinafter, defect) can be made of one or more defect material elements. A defect material element is a material element that belongs to the defect.

An electromagnetic emission spectrum of a part of the defect may be generated by applying a spectroscopy process.

The electromagnetic emission spectrum may provide an indication of the one or more defect material elements.

Nevertheless, the spectroscopy process may have a certain resolution. Accordingly, an ambiguity may exist in the electromagnetic emission spectrum. Such an ambiguity exists when an energy difference between peaks (associated with different material elements) is smaller than the resolution of the spectroscopy process.

For example, the resolution of the spectroscopy process may be about 80 to 90 electron volts and the spectroscopy process cannot distinguish between members of sets of lighter material elements and heavier material elements such as:

a. lighter material element silicon (Si) and either one of heavier elements tantalum (Ta) or tungsten (W).

b. lighter material element nitrogen (N) and heavier element titanium (Ti).

c. lighter material element oxygen (O) and either one of heavier elements vanadium (V) or chromium (Cr).

d. lighter material element fluorine (F) and heavier element iron (Fe).

e. lighter material element sodium (Na) and heavier element zinc (Zn).

f. lighter material element phosphorus (P) and heavier element zirconium (Zr).

The lighter material elements may be non-metallic and the heavier material elements may be metallic, but this is not necessarily so. For example—Germanium is quite heavy but is not metallic.

An example of these ambiguities are illustrated in table 1. In table 1 each row includes a set of material elements that exhibit energy peaks that are distance from each other by an energy difference that is smaller than the resolution of the spectroscopy process. It should be noted that other ambiguities can occur when applying other landing energies.

TABLE 1

| lighter material element | Heavier material element |
|---|---|
| Si | Ta, W |
| N | Ti |
| O | V, Cr |
| F | Fe |
| Na | Zn |
| P | Zr |

It has been found that a backscattered electron (BSE) image may assist in resolving the ambiguity, and determine which defect material element appears in the electromagnetic emission spectrum. The determination may pin point to the exact material element or may provide a rough classification to one of multiple classes of material elements.

Referring to table 1, for each set of the mentioned above sets—the intensity (for example gray level) of BSE image pixels of either one of the mentioned above lighter material elements of the set substantially differs (for example by at least 10%, 20%, 30% and the like) from the intensity of BSE image pixels of the mentioned above heavier material elements of the set.

Referring to the first row of table 1, the intensity of BSE image pixels of SI substantially differ from the intensity of BSE image pixels of Ta or W.

These intensity differences may be used to resolve the ambiguity, either alone or with additional information that can be acquired from the BSE image and the electromagnetic emission spectrum.

The additional information may relate to a background material that may surround the defect. A material element of the background material may be identified from the electromagnetic emission spectrum of the part of the defect—as it is expected that at least some of the BSE electrons of the BSE image are extracted from the background material that may be positioned below the defect.

The background material is usually known in advance. But even if it is not known in advance, the background material can be learnt from the electromagnetic emission spectrum. And the relationship between BSE image pixels of the background material and BSE image pixels of the defect may be used to determine the relationship between the atomic weight of the defect material element and the atomic weight of the background material element.

For example, if the electromagnetic emission spectrum illustrates that the background material is aluminum (Al) and the BSE image pixels of the defect are much brighter (stronger intensity) than the BSE image pixels of the background material then the defect includes the elements that are heavier than aluminum. If the defect is brighter than the background Si, and the defect contain a peak of Si or Ta or W in the electromagnetic spectrum the defect contains Ta or W.

If, for example, the electromagnetic emission spectrum illustrates that the background material is not Al, and the background material is Si, and if the BSE image pixels of the defect are much brighter (stronger intensity) than the BSE image pixels of the background material then the defect includes elements that are heavier than aluminum. Thus, if the electromagnetic spectrum includes F or Fe, the defect contains Fe.

The text below illustrates various methods. For simplicity of explanation each method is illustrated in reference to a single defect material element and up to a single ambiguity.

It should be noted that each method may be applied for each defect material element out of multiple defect material elements and may resolve multiple ambiguities.

For example, the electromagnetic emission spectrum may include multiple ambiguities, and each method may resolve each ambiguity.

FIG. 1 illustrates an example of method 100 for determining a defect material element. The method 100 may be performed by processing logic such as processing circuitry that may include one or more graphic processing unit, one or more central processing units (CPUs), one or more image processors, and/or one or more other integrated circuits such as application-specific integrated circuits (ASICs), field programmable gate arrays (FPGAs), full-custom integrated circuits, etc., or a combination of such integrated circuits Method 100 may start, at step 110, by acquiring, by a charged particle beam system and by applying a spectroscopy process, an electromagnetic emission spectrum of a part of a defect. A charged particle beam system is a system that obtains information about an object by illuminating the object with one or more charged particle beams and collects particles and/or photons emitted from the object. The analysis of the detected particles may be done by a processing circuitry of the charged particle beam system, by a one or more processing circuitry located outside the tool, or by a combination of both.

Step 110 may include illuminating a part of the defect with one or more electron beams and collecting charged particles such as x-rays. X-rays may be collected during energy dispersive spectroscopy (EDX).

Step 110 may be followed by step 120 of acquiring, by the charged particle beam system, a backscattered electron (BSE) image of an area that includes the defect.

Step 120 may be followed by step 130 of determining, by a spectroscopy process, a defect material element. Step 120 is based on the outcome of steps 110 (using EDX) and 120.

Step 130 may include steps 132 and 140.

Step 132 may include determining whether an ambiguity in the electromagnetic emission spectrum exists—if an energy difference between peaks (associated with different material elements) is smaller than the resolution of the spectroscopy process (if overlapping electromagnetic emission readings exist).

If the answer is yes, jumping to step 140 of resolving the ambiguity based on the BSE image: the information provided by the BSE image is used for differentiating between the materials with overlapping electromagnetic emission readings. The outcome of step 140 is an ambiguity free electromagnetic emission spectrum.

If the answer is no—ending step 130.

Step 140 may include selecting the defect material element out of potential material elements that exhibit peaks that are spaced apart from each other by an energy difference that is lower than a resolution of the spectroscopy process. Material with known overlapping electromagnetic emission readings may be looked at. Each row of table 1 is an example of such potential material elements.

For example, step 140 may include selecting a material element (i) out of F and Fe, or (ii) out of P and Zr, or (iii) out of N and Ti, or (iv) out of O and V or Cr.

Step 140 may include selecting the defect material element based on an intensity of one or more BSE image pixels of the defect.

Step 140 may be based, at least in part, on a background material element. The area (imaged during step 120) may include a defect and a background material that surrounds the defect. Step 140 may include determining a background material element of the background material.

The background material element has an atomic weight that belongs to a background atomic weight class (a period of the periodic table). Step 140 may include determining an atomic weight class of the defect material element based on a relationship between (a) an intensity parameter of one or more BSE image pixels of the background material, and (b) the intensity parameter of one or more BSE image pixels of the defect.

Brighter BSE image pixels indicate of a higher atomic weight while darker BSE pixels indicate of a lower atomic weight.

Step 140 may include classifying the atomic weight class of the defect material element to a class out of (a) lighter than background material class, (b) the background atomic weight class, and (d) at least one class of heavier than background material class.

For example, a defect material element may be classified (according to the intensity of BSE image pixels) to a class out of:

Second period of the periodic table of elements (for example—N, O or F).
Third period of the periodic table of elements (for example—Si, P or Na).
Fourth period of the periodic table of elements (for example—Ti, V, Cr, Fe, or Zn).
Fifth period of the periodic table (for example—Zr).
Sixth period of the periodic table of elements (for example—Ta or W).

Yet for another example, a defect material element may be classified (according to the intensity of BSE image pixels) to a class out of:

Lighter than substrate—for example second period of the periodic table of elements (for example—N, O or F).
Same class as substrate—for example—the third period of the periodic table of elements (for example—Si, P or Na).
A heavier class than the substrate—for example fourth, fifth or sixth period of the periodic table of elements (for example—Ti, V, Cr, Fe, or Zn, Zr, Ta or W).

The outcome of step 130 may be a determination of one or more defect material elements. The determination may be provided as an unambiguous electromagnetic emission spectrum of the part of the defect.

Step 130 may be followed by step 150 of responding to the outcome of step 130. For example—step 150 may include generating and/or sending an alert or indication about one or more material elements of the defect, storing the ambiguity free electromagnetic emission spectrum, storing the alert or indication, performing another spectroscopy process with different parameters and/or acquiring another BSE image, and the like. For example—the other spectroscopy process may be executed with higher landing voltages in order to see material elements that are hard to see in the previous spectroscopy process iteration. For example—step 120 may involve applying a relatively low kV EDX in order to keep interaction volume small and sensitivity high. However, some elements, in particular Ti, is challenging to see in low kV (overlapping peaks near 400V). Therefore, in case that steps 120-140 find N or Ti in 3 kV, another EDX process is executed with a higher kV (around 6 kV), where there is an additional Ti peak (4.5 kV). If there is 4.5 kV peak—there is Ti. If not see—it is N.

Assuming, for example, the presence of defect with heavier material elements is more problematic than the presence of a defect of lighter material. Under this assumption a presence of a heavier defect material element may trigger a more impactful response in relation to the response triggered by a lighter defect material element.

The response may include disqualifying the wafer, determining that the wafer or die is qualified despite the defect, re-evaluating the manufacturing process, and the like.

Figure 2:
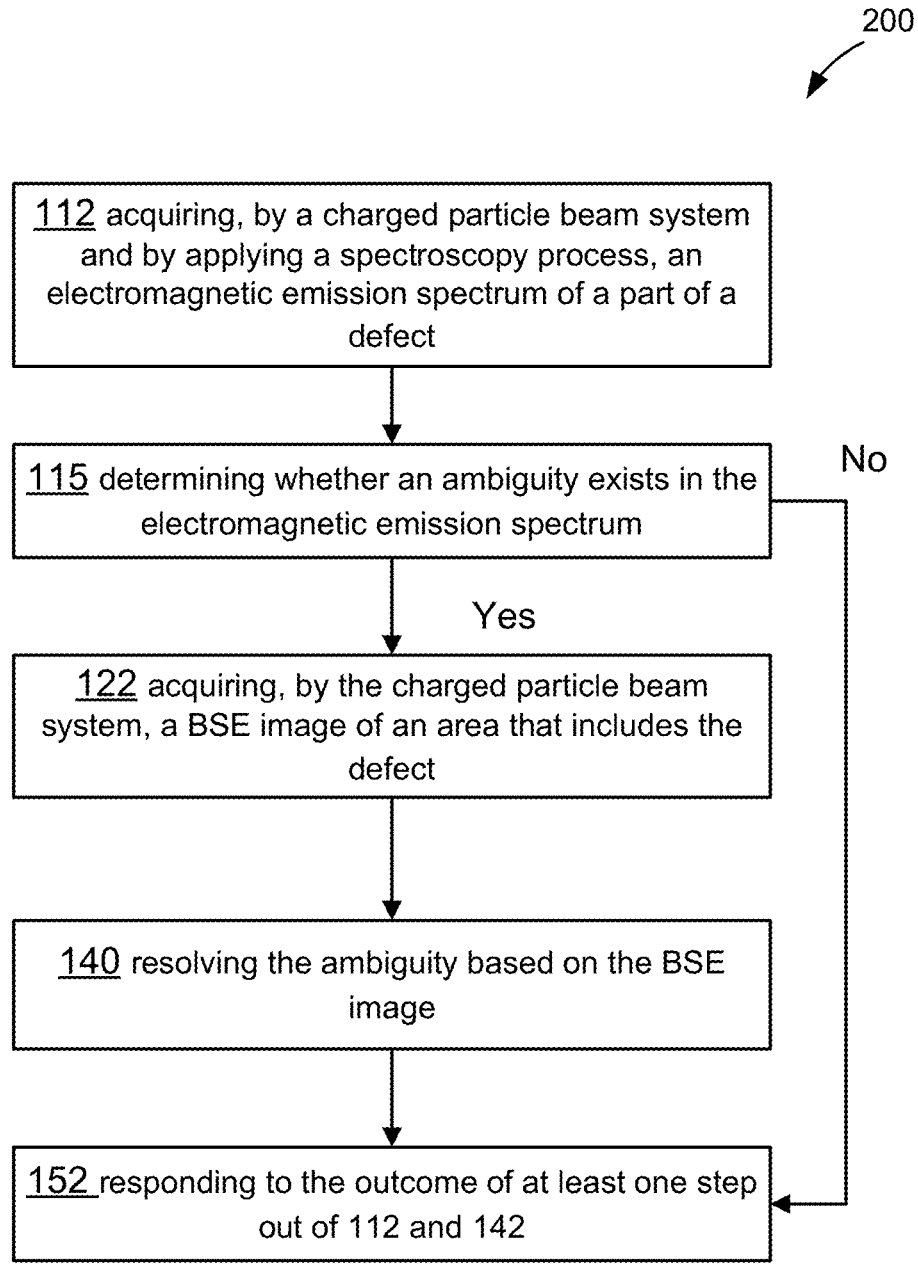
FIG. 2 illustrates an example of a method for determining a defect material element.

FIG. 2 illustrates method 102 for determining a defect material element.

Method 102 may start by step 112 of acquiring, by a charged particle beam system and by applying a spectroscopy process, an electromagnetic emission spectrum of a part of a defect.

Step 112 may include illuminating a part of the defect with one or more charged electron beam and collecting charged particles such as x-rays. X-rays may be collected during energy dispersive spectroscopy (EDX).

For simplicity of explanation it is assumed that step 112 involves applying a EDX process.

Step 112 may be followed by step 115 of determining whether an ambiguity exists in the electromagnetic emission spectrum.

If there is no ambiguity step 115 may be followed by step 152.

If there is an ambiguity (or more than a single ambiguity)—step 115 is followed by step 122 of acquiring, by the charged particle beam system, a BSE image of an area that includes the defect.

Step 122 may be followed by step 142 of resolving the ambiguity based on the BSE image.

Step 142 may be followed by step 152 of responding to the outcome of at least one step out of 112 and 142.

In Method 102, BSE images are acquired (in step 122) only in response to the determination of existing ambiguity in the electromagnetic emission spectrum (in step 115). Method 110 is different from method 112, as BSE images are acquired (in step 120), prior to determining whether an ambiguity in the electromagnetic emission spectrum exists (in step 132). In method 112, fewer BSE images may be acquired, comparing the number of BSE images acquired in method 110, thus the overall duration of method 112 maybe shorter that the duration of method 110.

Figure 3:
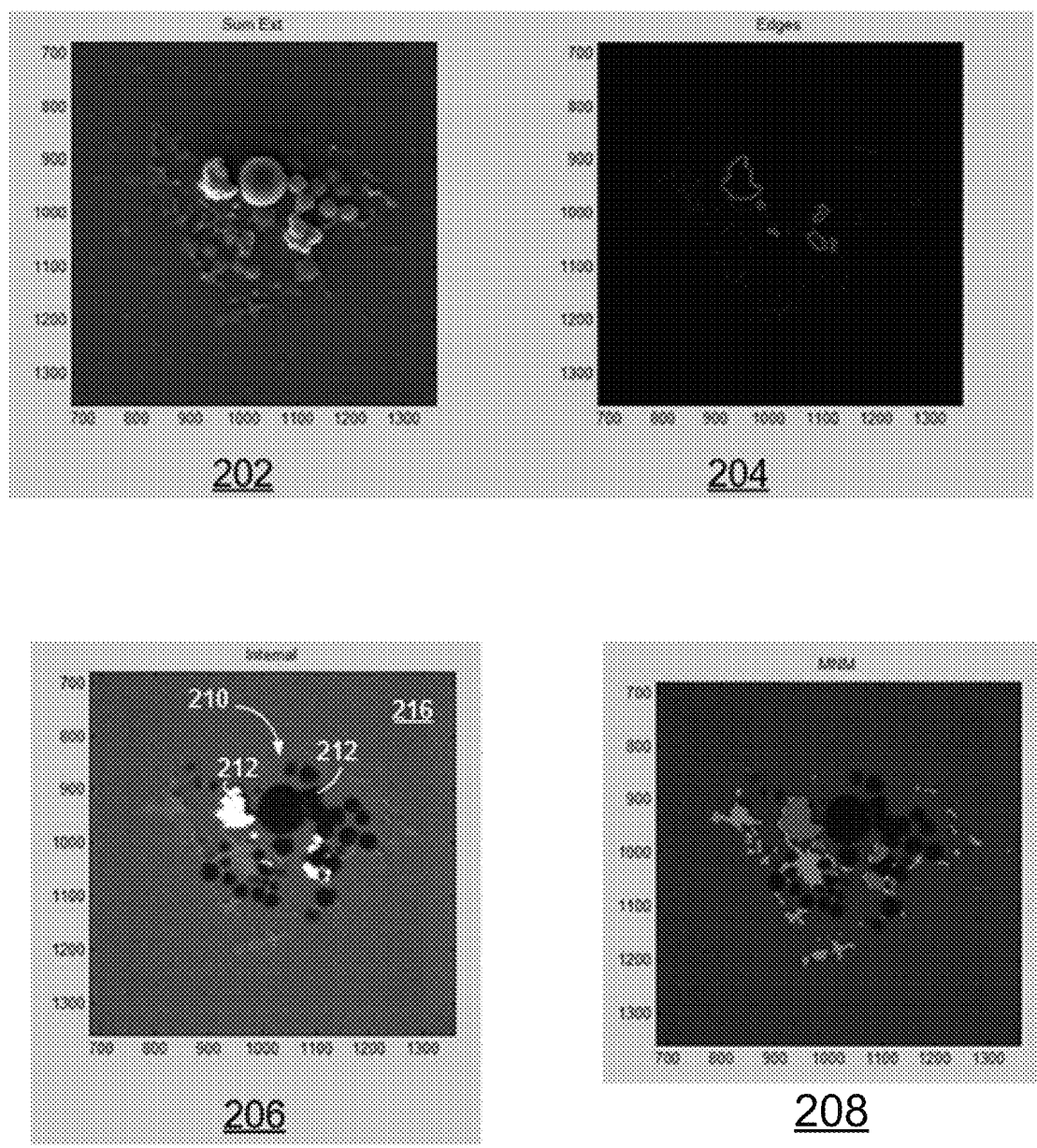
FIG. 3 illustrates examples of various images of defects that include multiple defect material elements.

FIG. 3 illustrates examples of various BSE images 202-208 of defects, acquired by a charged particle beam, in accordance with method 110 or 112. The defects shown in the images include multiple defect material elements.

BSE image 202 illustrates a defect 210 that includes multiple defect material elements. BSE image 204 illustrates edges of the defect. BSE image 206 illustrates the area that includes a defect 210 that is surrounded by a silicon background material 216. The defect 210 includes a heavier material element 214 and a lighter material element 212. Synthetic image 208 colors the different defect material elements with different colors.

It should be noted that any of the mentioned above methods may be modified—and that the acquisition of one or more BSE images may be executed without checking if an ambiguity exists.

It should be noted that any of the mentioned above methods may or may not include generating an amended EDX spectrum—that takes into account solved ambiguities (if such exist).

Surface Information:

The acquisition of a BSE image of an area that includes a defect includes illuminating the area with a change particle beam having a landing energy thereby causing BSE electrons to be emitted from the sample, and detecting at least some of the BSE electrons by a BSE detector.

The BSE electrons that are emitted from the sample may originate from the surface of the area as well as from different depths within the sample.

For example—at landing energy of few kilo Volts, most of the BSE electrons that form a BSE image are emitted well below non-buried defects such as foreign particles.

In cases where the defects are not buried defects—or at least are mostly positioned above the surface of the sample—it may be beneficial to collect BSE electrons emitted from the surface (and maybe up to a depth threshold)—while rejecting (not detecting) BSE electrons that are emitted from depths that exceed the depth threshold.

This may be performed using low loss BSE imaging. The low loss BSE spectroscopy includes using an energy filtering and rejecting BSE electrons having an energy that is below an energy threshold. The energy threshold may be set to be substantially equal to the incident energy. For example—the energy threshold may be equal to about 60-99% of the incident energy. Thus—for a landing energy 2 kV, the energy threshold may be between 1.5 kV and 1.95 kV. Other energy thresholds may be applied for.

This will cause the BSE image to be formed mostly from BSE electrons having an energy that is above the energy threshold.

The energy filtering reduces the amount of BSE electrons that reach the BSE filter—but it better represents the material elements of the defect rather than the material of the substrate. This may be especially true for defects that are smaller than 100 nm.

Accordingly, step 120 of any one of methods 100 and 102 may include acquiring low loss BSE images.

Figure 4:
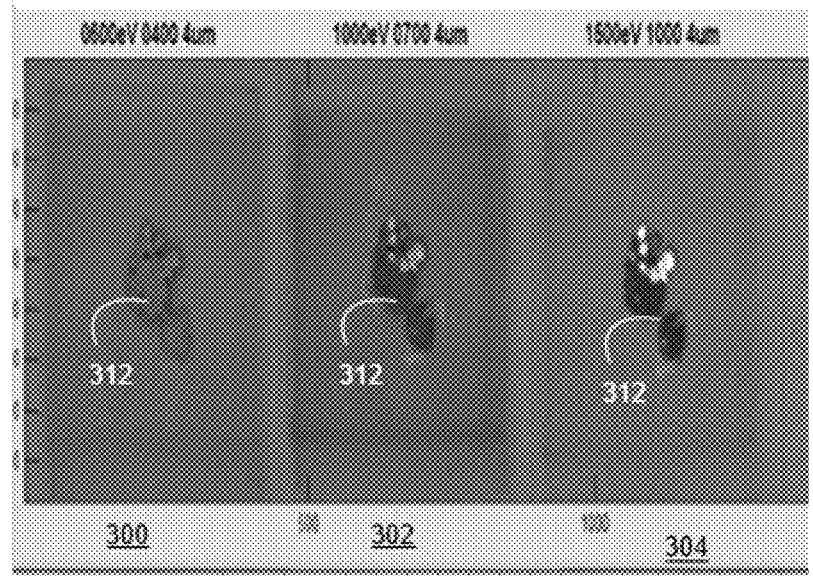
FIG. 4 illustrates examples of various BSE (Backscattered Electron) images.
Figure 4:
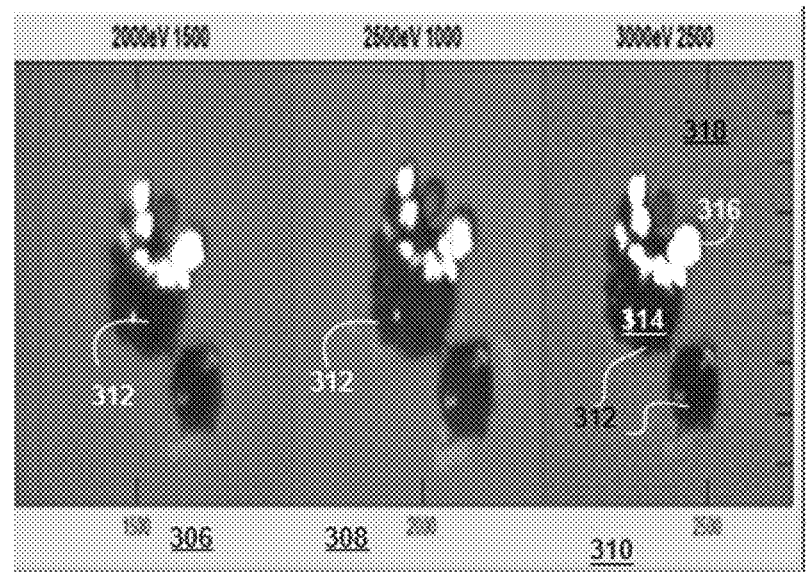

BSE images 300, 302, 304, 306, 308 and 310 of FIG. 4 illustrates BSE images of an area that includes a defect 312. BSE images 302, 304, 306, 308 and 310 are acquired while applying different energy filters. BSE images 308 and 310 are acquired using beam landing energy of 2 kV and energy filters between 1.5 kV and 1.8 kV. It can be seen that BSE image 300 is formed mostly from BSE electrons that are emitted from the background material below defect 312—as the BSE image pixels of the defect 312 have a very similar intensity to the BSE image pixels of the background material 316.

On the other hand, BSE images 308 and 310 clearly show that defect 312 includes a high impedance (high Z) defect material element 316 and a low Z defect material element 318—both are well distinguished from the background material.

Figure 5:
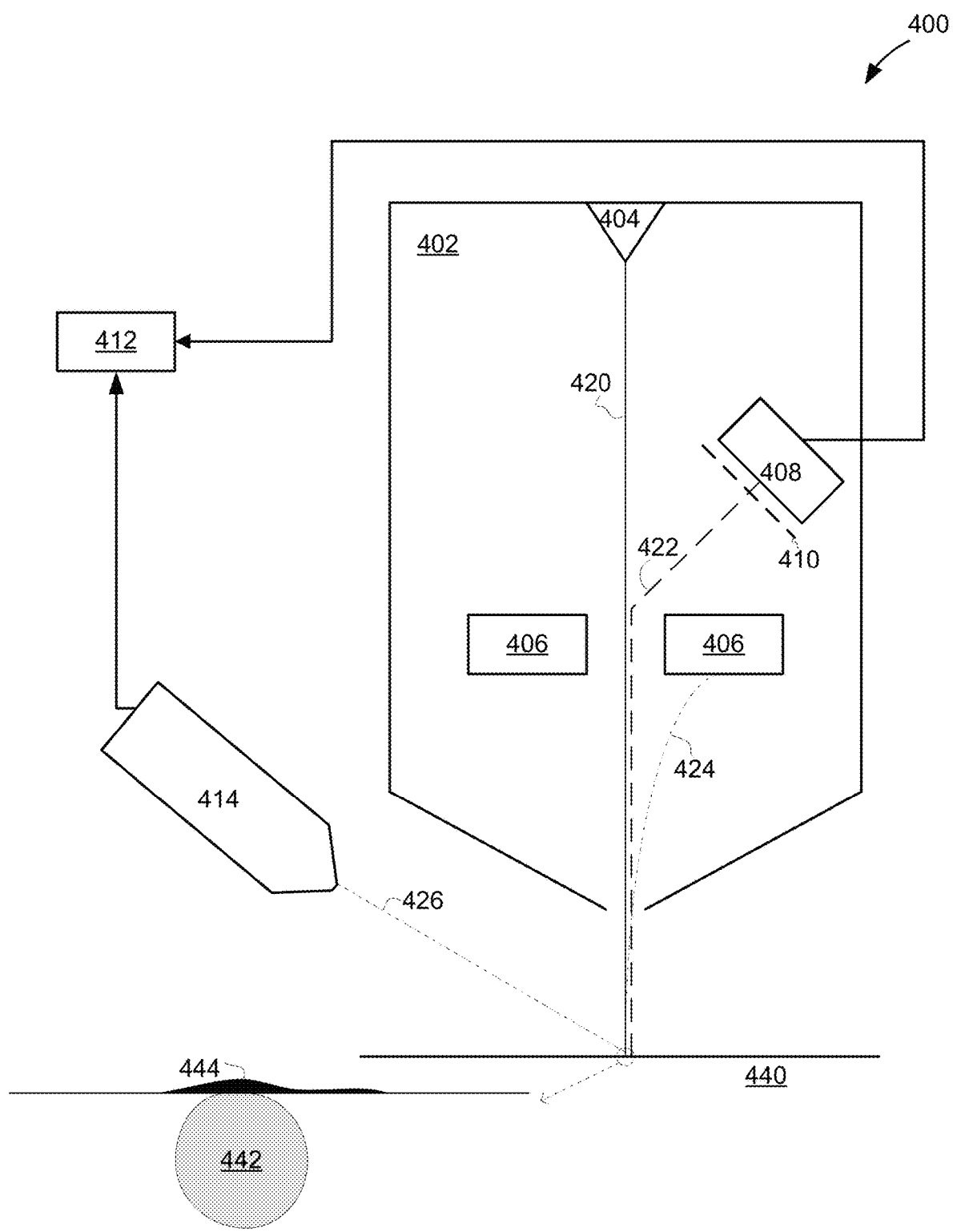
FIG. 5 illustrates an example of a charged particle beam system.

FIG. 5 illustrates an object 440 and a charge particle beam system 400.

The charged particle beam system 400 may include charged particle optics and a processor. The charged particle beam system 400 may be configured to execute at least one method of methods 100 and 102.

In FIG. 5 the charged particle optics is illustrated as including EDS detector 414 for detecting x-ray particles 426 and charged particle column 402.

Charged particle column 402 includes beam source 404 for outputting an charged particle beam 420, BSE detector 408 for detecting BSE electrons 422, and energy filter 410 for filtering BSE electrons before they reach the BSE detector 408. FIG. 5 also illustrates a secondary electron detector 406 for detecting secondary electrons 424.

The charge particle optics is configured to (i) acquire, by applying a spectroscopy process (illuminating the object with charged particle beam 420 and detecting x-ray particles by EDS detector 414, an electromagnetic emission spectrum of a part of a defect; and (ii) acquire a backscattered electron (BSE) image of an area that comprises the defect.

Processing circuitry 412 may be configured to determine a defect material element by (a) determining whether an ambiguity exists in the electromagnetic emission spectrum, and (b) resolving the ambiguity based on the BSE image, when it is determined that the ambiguity exists.

It should be noted that the charge particle beam system 400 may have other configurations. For example, the charge particle beam system 400 may include an AES detector instead or in addition to the EDS detector, there may be multiple BSE detectors, there may be any spatial relationship between the column and the EDS detector, the BSE detector may be positioned elsewhere, the angle of illumination may be non-normal to the object, the charged particle beam system 400 may be without a secondary electron detector, any one of the beams may be deflected and/or manipulated in manners that are not shown in FIG. 5, there may be additional optical elements such as condensing lenses or any other optic lens or element.

FIG. 5 also illustrates defect 444 and a region 442 below the defect 444 from which BSE electrons may be emitted.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for determining a defect material element of a defect, the method comprising:

acquiring, by a charged particle beam system and by applying a spectroscopy process, an electromagnetic emission spectrum of a part of the defect;

acquiring, by the charged particle beam system, a backscattered electron (BSE) image of an area that comprises the defect; and determining the defect material element by determining whether an ambiguity exists in the electromagnetic emission spectrum and resolving the ambiguity based on the BSE image in response to determining that the ambiguity exists;

wherein acquiring the BSE image comprises illuminating the area with electrons having an incident energy and generating the BSE image substantially only from BSE electrons having an energy above an energy threshold.

2. The method according to claim 1 wherein resolving the ambiguity comprises selecting the defect material element out of potential material elements that exhibit peaks that are spaced apart from each other by an energy difference that is lower than a resolution of the spectroscopy process.

3. The method according to claim 2 wherein the potential material elements comprise an organic material element and a heavier material element.

4. The method according to claim 1 wherein resolving the ambiguity comprises selecting the defect material element based on an intensity of one or more BSE image pixels of the defect.

5. The method according to claim 1 wherein the area comprises the defect and a background material that surrounds the defect, and wherein the method comprises determining a background material element of the background material.

6. The method according to claim 5 wherein determining the defect material element is based on the background material element.

7. The method according to claim 6 wherein the background material element has an atomic weight that belongs to a background atomic weight class, and wherein determining the defect material element comprises determining an atomic weight class of the defect material element based on a relationship between (a) an intensity parameter of one or more BSE image pixels of the background material, and (b) the intensity parameter of one or more BSE image pixels of the defect.

8. The method according to claim 7 comprising classifying the atomic weight class of the defect material element to a class out of (a) lighter than background material class, (b) the background atomic weight class, and (d) at least one class of heavier than background material class.

9. A method for determining a defect material element of a defect, the method comprising:

acquiring, by a charged particle beam system and by applying a spectroscopy process, an electromagnetic emission spectrum of a part of the defect;

acquiring, by the charged particle beam system, a backscattered electron (BSE) image of an area that comprises the defect; and determining the defect material element by determining whether an ambiguity exists in the electromagnetic emission spectrum and resolving the ambiguity based on the BSE image in response to determining that the ambiguity exists;

wherein the area comprises the defect and a background material that surrounds the defect, and wherein the method comprises determining a background material element of the background material; and wherein the background material is silicon, wherein the determining of the defect material element comprises classifying the defect material element to a class out of (a) second period of the periodic table of elements, (b) third period of the periodic table of elements, (c) fourth period of the periodic table of elements, and (d) sixth period of the periodic table of elements.

10. The method according to claim 1 comprising determining whether the ambiguity exists in the electromagnetic emission spectrum, and acquiring the BSE image in response to the ambiguity existing in the electromagnetic emission spectrum.

11. A method for determining a defect material element of a defect, the method comprising:

acquiring, by a charged particle beam system and by applying a spectroscopy process, an electromagnetic emission spectrum of a part of the defect;

acquiring, by the charged particle beam system, a backscattered electron (BSE) image of an area that comprises the defect; and determining the defect material element by determining whether an ambiguity exists in the electromagnetic emission spectrum and resolving the ambiguity based on the BSE image in response to determining that the ambiguity exists;

wherein acquiring the BSE image comprises rejecting BSE electrons that originate from locations that are positioned below a certain depth from a surface of the area.

12. A non-transitory computer readable medium comprising instructions, which when executed by a processor, cause the processor to perform operations comprising:

acquiring an electromagnetic emission spectrum of a part of a defect;

acquiring a backscattered electron (BSE) image of an area that comprises the defect; and determining a defect material element by determining whether an ambiguity exists in the electromagnetic emission spectrum and resolving the ambiguity based on the BSE image in response to determining that the ambiguity exists;

wherein acquiring the BSE image comprises illuminating the area with electrons having an incident energy and generating the BSE image substantially only from BSE electrons having an energy above an energy threshold.

13. A charged particle beam system that comprises charged particle optics and a processor, wherein the processor is configured to:

acquire, by applying a spectroscopy process, an electromagnetic emission spectrum of a part of a defect;

acquire a backscattered electron (BSE) image of an area that comprises the defect; and determine a defect material element by determining whether an ambiguity exists in the electromagnetic emission spectrum and resolving the ambiguity based on the BSE image in response to determining that the ambiguity exists;

wherein acquiring the BSE image comprises illuminating the area with electrons having an incident energy and generating the BSE image substantially only from BSE electrons having an energy above an energy threshold.

* * * * *